United States Patent
Truninger (10) Patent No.: US 6,647,719 B2
(45) Date of Patent: Nov. 18, 2003

(54) HYDRAULIC OSCILLATOR AS A DRIVE OF MACHINES

(75) Inventor: Rolf Truninger, Langendorf (CH)

(73) Assignee: Globemag L.P., Edinburgh (GB)

( * ) Notice: Subject to any disclaimer, the term of this patent is extended or adjusted under 35 U.S.C. 154(b) by 0 days.

(21) Appl. No.: 10/056,138

(22) Filed: Jan. 24, 2002

(65) Prior Publication Data

US 2002/0112476 A1 Aug. 22, 2002

(30) Foreign Application Priority Data

Feb. 17, 2001 (CH) .................................... 2001 0284/01

(51) Int. Cl.⁷ .............................................. F16D 31/02
(52) U.S. Cl. ............................. 60/414; 60/416; 60/476
(58) Field of Search ........................ 60/413, 414, 416, 60/417, 445, 446, 473, 475, 476; 92/134

(56) References Cited

U.S. PATENT DOCUMENTS 2,699,649 A * 1/1955 Messick ...................... 92/134
3,855,791 A * 12/1974 Quinto ......................... 60/476
3,971,215 A * 7/1976 Baron et al. .................. 60/413
5,007,544 A * 4/1991 Saotome et al. .............. 60/413
5,428,958 A * 7/1995 Stenlund ..................... 60/445

FOREIGN PATENT DOCUMENTS

WO    WO 97/05387    2/1997

* cited by examiner

*Primary Examiner*—Edward K. Look
*Assistant Examiner*—Thomas E. Lazo
(74) *Attorney, Agent, or Firm*—Henry M. Feiereisen (57) ABSTRACT

The invention proposes a novel drive with electrical power control for machines which have to execute cyclic movements with high accelerations. An electric motor drives a pump which, in turn, is connected directly to a cylinder. This arrangement has added to it a system of pressure accumulators and valves which give the system the property of an oscillator. The acceleration forces in the event of a cyclic movement near to resonance are then exerted largely by the pressure accumulators and the cylinders connected to these. This leads to a relieving of the electric motor and makes it possible to install lower powers on the machine or else, for the same power, achieve shorter cycle times of the machine.

17 Claims, 5 Drawing Sheets

HYDRAULIC OSCILLATOR AS A DRIVE OF MACHINES

CROSS-REFERENCES TO RELATED APPLICATIONS

This application claims the priority of Swiss Patent Application Serial No. 2001 0284/01, filed Feb. 17, 2001 the subject matter of which is incorporated herein by reference.

BACKGROUND OF THE INVENTION

The present invention relates, in general, to a hydraulic oscillator as a drive of machines.

Many working machines, such as are used, for example, for punching, nibbling, embossing, hammering, forming, injection moulding or diecasting, are distinguished by rapid cyclic movements. In a punching machine, the force of the tool drive essentially determines the maximum size of the tools or the maximum thickness of the machinable material. The speed of the drive, in turn, influences the number of strokes per minute, this being an important characteristic with regard to productivity.

Owing to the stringent force and speed requirements, the tool drives of such machines are often designed hydraulically. Thus, in conjunction with high-speed valves and an electronic control, important process parameters, such as, for example, the speed profile, can be adapted to the requirements of the working process in a flexible way.

Valve technology has proved appropriate in the field of controlled hydraulic drives. In a typical solution to the above object, the working cylinder is equipped with a control valve or servovalve. The speed of the cylinder can thus be controlled accurately. A desired speed profile can be imparted to the cylinder. In addition to conventional control valves or servovalves, there is also quite a number of special valves which have been developed for this type of machines.

The solution with valves has the disadvantage that considerable throttle losses occur at the control edges of the valves. These losses heat up the hydraulic medium and, over time, lead to high energy or operating costs of the machine. For this reason, new solutions have recently been discussed. One advantageous solution is a direct drive by means of a variable-speed hydraulic pump (European Patent Application 96 913 422.0 ). The cylinder is in this case connected directly to the pump. The oil stream is controlled by the pump or by the drive motor of the pump and no longer by the valve. The valve consequently becomes superfluous as a hydraulic control element. The task of power control is assumed for the first time by electronic power actuators, in particular power transistors. These components are contained, as a rule, in the converter which supplies the variable-speed electric motor with current. The hydraulics in this case now assume only the function of a hydrostatic transmission, while control of power is performed by electrical engineering, in particular by the converter and the electric motor.

The replacement of hydraulic elements, such as variable displacement pumps or valves, by electronic power transistors has many advantages. In addition to the energy savings, this procedure makes it possible to achieve a markedly better control quality, thus, inter alia, higher reproducibility and higher thermostability, along with a markedly lower generation of noise.

On the other hand, this solution also has the disadvantage that, as a rule, the electric motor has pronounced inertia which, during cyclic movements of high frequency, has to be accelerated and decelerated correspondingly frequently. This greatly restricts the number of strokes capable of being achieved by such drives and leads to a substantial proportion of the motor power being used in order to overcome the rotational inertia of the motor. Only part of the motor power is therefore available for the actual working process.

The higher the frequency of movement is, the more motor power is used to overcome the motor's own inertia. In an extreme case, during the entire cycle, the motor follows the predetermined speed profile with full torque, without performing any outwardly directed work. This state is reached at the maximum number of strokes capable of being achieved by the drive. Energy is then no longer delivered outwards, and the windings of the motor are constantly loaded with the maximum current and heat up the latter correspondingly.

It would therefore be desirable and advantageous to provide an improved high-speed cyclic drive for hydraulic machines, which obviates prior art shortcomings and operates without control valves, is controlled by electronic power transistors and follows a cyclic speed profile, whilst at the same time having a markedly lower power requirement. The lower drive-specific power requirement is to make it possible to implement larger numbers of strokes, along with a lower energy consumption, or to make available a greater share of power for the working process in the machine.

It would also be desirable and advantageous to design such a drive as a drive module which can be used for a multiplicity of machines and drive tasks. The invention is therefore to be interpreted in general terms as a drive of a machine joint.

SUMMARY OF THE INVENTION

According to one aspect of the present invention, two hydraulic cylinders act on the machine joint to be driven. They form four hydraulic chambers which are linked hydraulically to the machine joint. One chamber per cylinder is connected to one of the two ports of a hydraulic pump. The other chamber of the two cylinders each are connected to an energy accumulator. The pump is coupled to an electric motor and is driven by the latter.

The hydraulic pump acts in a closed hydraulic circuit on the two connected cylinder chambers. When the pump is driven by the electric motor in one direction, the machine joint moves in one direction. A reversal in direction of the electric motor results correspondingly in a reversal in direction of the machine joint.

The two energy accumulators exert the machine joint with a potential force driving back the machine joint. In general, this force increases with an increasing travel of one cylinder and decreases correspondingly in the opposite cylinder. If the energy accumulators are designed as pressure accumulators, the potential forces are pressure forces on the pistons of the cylinders. The energy accumulators may also be designed, for example, as elastic springs.

The two energy accumulators act like two springs on both sides of the load mass and turn the system into an oscillator. The speeds of the hydraulic pump and the electric motor are coupled hydraulically to the load mass. Accordingly, the load mass, together with the rotational inertia moment of the pump and motor, is to be considered as a single mass inertia between two springs. This applies at least in a first approximation if the retained oil is not considered to be compressible.

If this system is left, in the deflective state, to the free play of the forces, a natural oscillation of the spring/mass system occurs, which is defined essentially by the two energy accumulators and also all the masses and rotational inertias. This natural oscillation is damped by means of the hydraulic and mechanical power loss of all the components. In such an oscillator according to the invention, energy is exchanged between the energy accumulators and the machine joint during movement. Pressure energy in the pressure accumulator accelerates the machine joint and is consequently converted into kinetic energy of the machine, pump and electric motor. During deceleration, in turn, kinetic energy is converted into potential energy.

The forces of the motor can be controlled accurately and highly dynamically via the power electronics. By means of the device, therefore, a position can also be held or any desired speed profile can be adopted. In general, the potential forces of the energy accumulators act as additional loads on the motor which, as the case may be, assist or resist the movement of the machine joint. During an oscillating movement, the forces of the energy accumulators have, in the case of a suitable design, an assisting effect, that is to say lead to a reduction in the mean application of current to the motor, compared with the same movement cycle without potential forces of the energy accumulators.

If the movement cycle of the machine coincides with the natural oscillation of the device, the motor has to apply only minimal power losses and the power exerted outwards by the machine. Ideally, therefore 100% of the drive power is fed as useful power to the working process, leaving frictions and hydraulic losses aside. This is in complete contrast to a system according to the prior art which in the worst case (at the maximum achievable frequency) requires the entire motor power for accelerating the motor and can deliver 0% of the drive power outwards. This also applies when hydraulic losses in the lines or frictional losses in the components of the device are disregarded.

BRIEF DESCRIPTION OF THE DRAWING

Other features and advantages of the present invention will be more readily apparent upon reading the following description of currently preferred exemplified embodiments of the invention with reference to the accompanying drawing in which.

DETAILED DESCRIPTION OF PREFERRED EMBODIMENTS

Throughout all the Figures, same or corresponding elements are generally indicated by same reference numerals.

Figure 1:
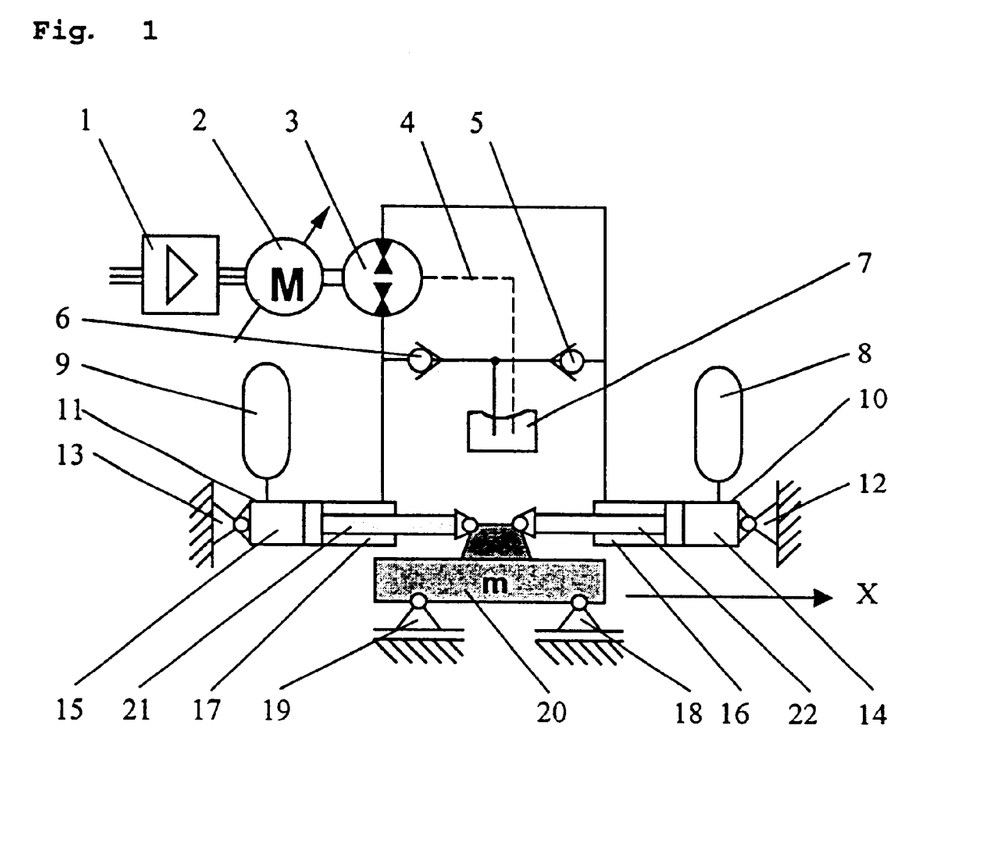
FIG. 1 is a schematic illustration of a drive according to the present invention for operating a load mass.

Turning now to the drawing, and in particular to FIG. 1, there is shown a drive according to the invention, used to drive a machine joint, comprised of a load mass 20 which is displaceable on the guides 18, 19 in the direction X. The pump 3 is connected hydraulically to two chambers 16, 17 of the cylinders 10, 11. The two cylinder rods 21, 22 of the cylinders 10, 11 are coupled mechanically via the load 20. The arrangement thus acts in the same way as a single cylinder which is supplied in a closed hydraulic circuit with pressure oil from the pump 3.

The bearings 12, 13 symbolize a fixed mechanical connection to the machine. The leakage line 4 of the pump 3 discharges a small oil stream into the tank 7. The oil passes via the two non-return valves 5, 6 back into the drive circuit again as soon as the pressure in one of the two pump connections falls below the pressure level in the tank 7. The tank 7 may in this case be designed as a tank, a separate pump assembly or an other pressure source.

When the arrangement moves in the direction X, the oil in the chamber 14 is displaced into the pressure accumulator 8 and consequently increases the pressure in the pressure accumulator 8. The volume in the chamber 15 increases correspondingly and the pressure in the pressure accumulator 9 falls. This results in a restoring force which is defined by the pressures in the two chambers 14, 15 and rises with an increasing deflection in the direction X.

According to the invention, then, the components are designed in such a way that the restoring forces ideally assist the desired speed profile of the drive. If the pressures in the pressure accumulators 8, 9 are selected very low or neglected, this results virtually in a straightforward close-circuit pump drive. With increasing pressure in the pressure accumulators, the spring forces of the pressure accumulators become higher and, in the case of an appropriate design, assist the desired cyclic movement of the load mass. The motor 2, pump 3, cylinder rods 21, 22 and load mass 20 then no longer have to be accelerated solely by the electromagnetic forces of the motor 2, but in this case are assisted by the pressure forces of the pressure accumulators.

The nearer the desired movement comes to the natural oscillation of the system, the higher is the power share of the pressure accumulator forces and the lower is the power share of the motor.

Figure 2:
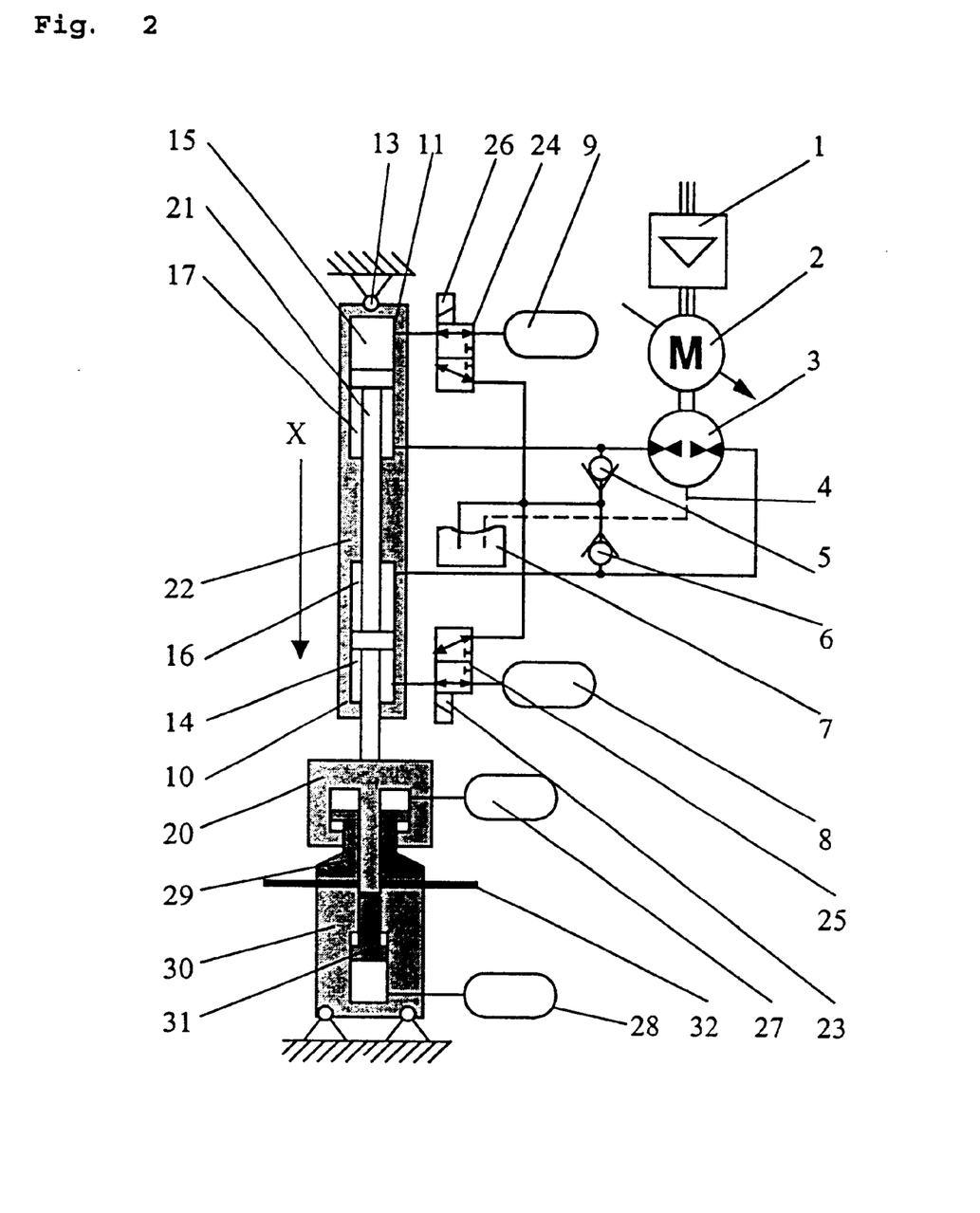
FIG. 2 is a schematic illustration of a drive according to the present invention for operating a punching machine.

Referring now to FIG. 2, there is shown a particularly advantageous embodiment of a device according to the invention for driving a punching or embossing machine. The two cylinders 10, 11 have been combined in a block 22. Two valves 24, 25 have been introduced as an additional element. The cylinder chambers 14, 15 can be switched to the tank 7 from the pressure accumulators 8, 9 by means of the valve magnets 23, 26.

Consequently, the spring force is also switched away from the cylinders. When, during the cyclic movement of the shaft, the pressure accumulators are cut out after the reversal of movement, this results in a phase in the movement cycle which is driven only by the electric motor. This operating mode may be expedient when relatively large strokes are to be executed at an approximately constant speed.

The cut-in and cut-out of the valves 24, 25 can be controlled by the position of the piston rod, and the valves 24, 25 may also be integrated in the cylinder. Cut-in and cut-out then always take place at the same point. The drive thus behaves in the same way as a trampoline jumper who jumps on a spring and is thrown back by this in order thereby to execute an approximately force-free ballistic movement. According to the invention, the forces of the electric motor 2 are used only to influence the natural form of the movement, so that the resulting movement meets the requirements of the working process.

The pressure accumulators 8, 9, 27, 28 may also be used for further hydraulic secondary functions, such as, for example, small auxiliary pistons or valve pilot controls. There do not necessarily have to be four independent pressure accumulators, but the function of the oscillator may also be ensured by only one pressure accumulator.

The punching tool consists of the parts, punching ram 20, press plate 29, die 30, ejector 31 and the metal strip 32 to be machined. The tool indicated in this example of use is passive, that is to say the movement of the press plate 29 and ejector 21 is defined by hydraulic spring forces of the pressure accumulators 27, 28 and mechanical movement limitation, without any specific movement control. Further hydraulic functions with valve control may, of course, also be integrated in the tool.

Figure 3:
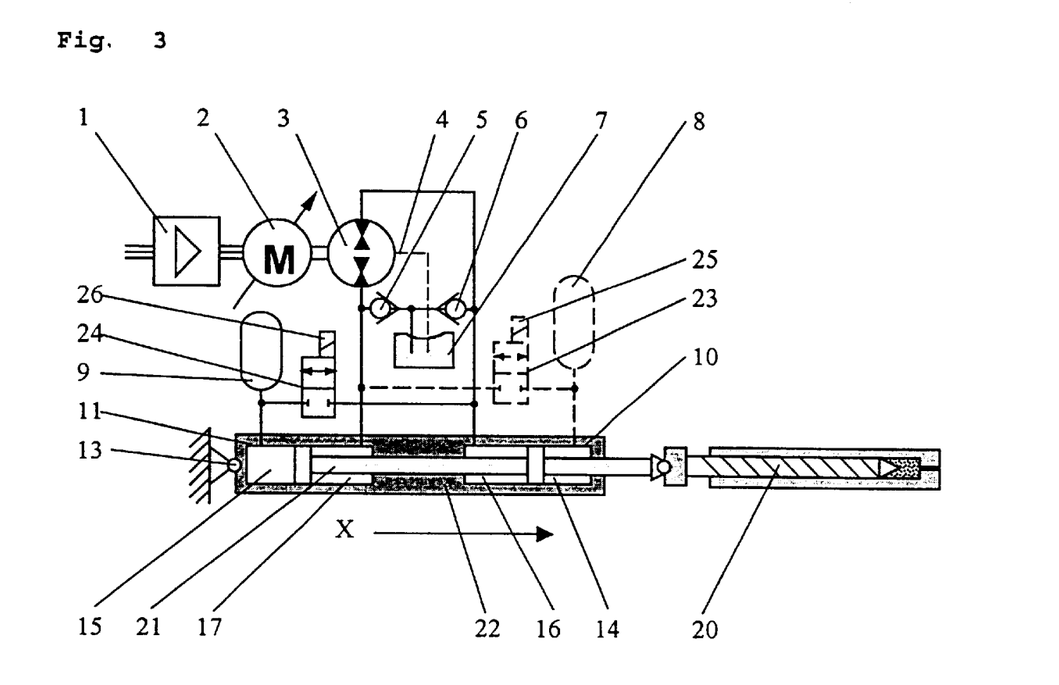
FIG. 3 is a schematic illustration of a drive according to the present invention for operating an injection unit.

FIG. 3 shows a further version of a device according to the invention. The machine joint is designed, here, as an injection unit 20 of an injection-moulding machine and has to apply very high forces and powers in the direction X, in order to press the plastic under high pressure into the die of a machine which is not depicted. After the injection operation, the injection unit has to be moved back into the initial position again under forces which are virtually disappearing.

This asymmetric function is also reflected by an asymmetric design of the device according to the invention. If a relatively high pressure level in the accumulator 9 and a relatively large cross section of the cylinder chamber 15 are selected, the force range of the device is shifted towards positive forces in the direction X, along with correspondingly reduced forces in the opposite direction.

In an extreme case, the accumulator 8 may be omitted. If the device has an appropriate design, the entire torque of the motor 2 is required in order to bring the piston rod 21 into the initial position prior to the injection operation or hold it in this position. During the subsequent injection operation, the motor 2, pump 3 and pressure accumulator 9 work in the same direction. The powers of the pressure accumulator and the pump are thus added together.

It can easily be seen that the power of the motor/pump assembly used can be doubled in this way. This can be converted into higher forces or a higher acceleration of the drive. This embodiment of a device according to the invention is therefore particularly suitable in machines which have to achieve very high forces or accelerations in only one direction.

The valves 23, 24 constitute a further special element of a device according to the invention. The valve magnets 25, 26 switch the valves 23, 24 and consequently connect the pressure accumulators 8, 9 in each case to a delivery line of the pump. The pressurizing pressure in the pressure accumulators 8, 9 can be varied in this way. The valves may in this case also be supplied by another independent pressure source. In addition to the pressurizing pressure, the neutral position may, of course, also be set by means of this device. We mean by neutral position the position of the piston rod 21 in which the pressure forces of the accumulators 8, 9 are neutralized.

Figure 4:
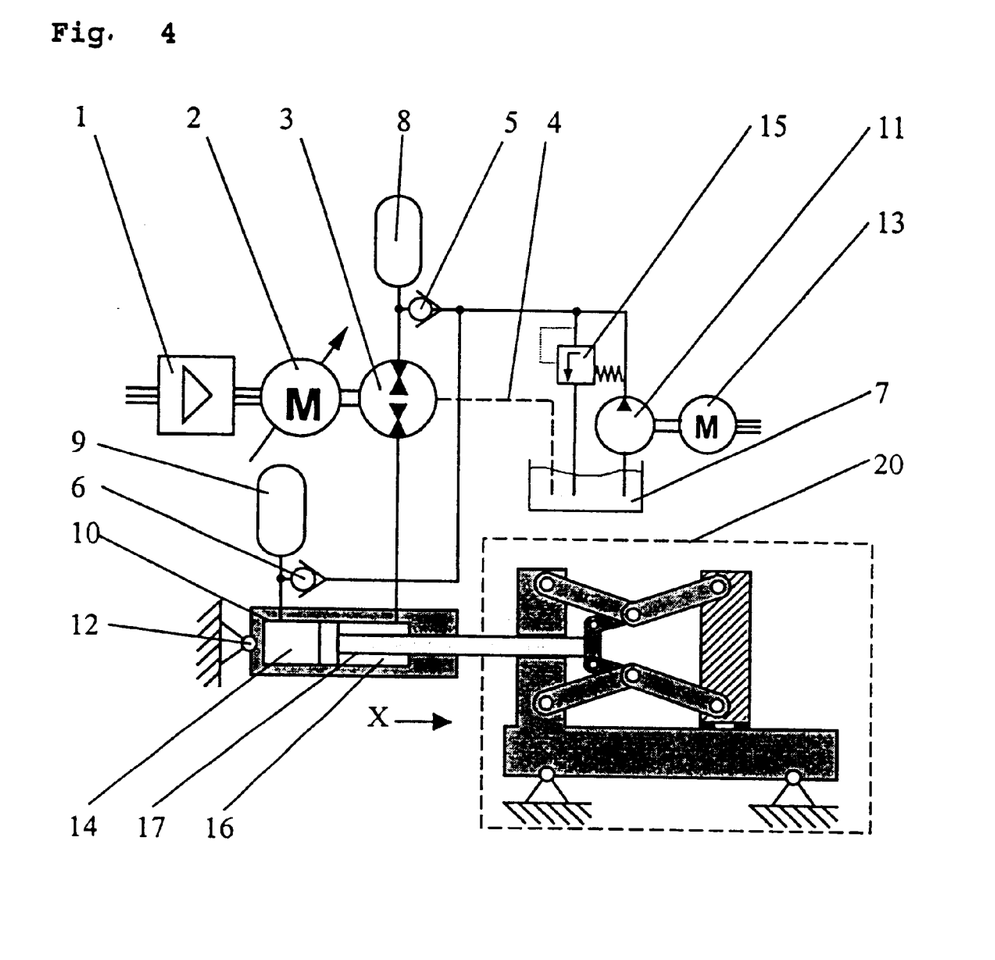
FIG. 4 is a schematic illustration of a drive according to the present invention for operating a toggle lever mechanism.

FIG. 4 shows a modified form of a device according to the invention for driving a toggle lever mechanism 20. Only a single cylinder 10 has been used. The pump 3 and pressure accumulators 8, 9 have in this case no longer been connected in parallel, as in FIGS. 1 to 3, but one behind the other (in series). Accordingly, only two cylinder chambers 14, 16 are required.

However, the functioning of the device is not changed as a result. A hydraulic oscillator having the properties described in the preceding sections can also be implemented in this way. When the pump conveys oil from the cylinder chamber 16 into the pressure accumulator 8, the pressure in the accumulator 8 rises and the piston rod 17 is displaced in the direction X, driven by the pressure forces in the chamber 14. These pressure forces are thereby reduced. Overall, the entire apparatus again acts in the same way as a spring/mass oscillator which can execute a cyclic movement (natural oscillation) even without external forces.

A further special feature of the device according to the invention, shown in FIG. 4, is the second pump assembly consisting of the motor 13, pump 11 and pressure relief valve 15. This unit generates a constant pressure on the non-return valves 5, 6 and ensures that the pressure in the pressure accumulators 8, 9 does not fall below a preset minimum value. The pump assembly also replaces leakage oil of the pump 3 which passes through the leakage-oil line 4 into the tank 7.

Figure 5:
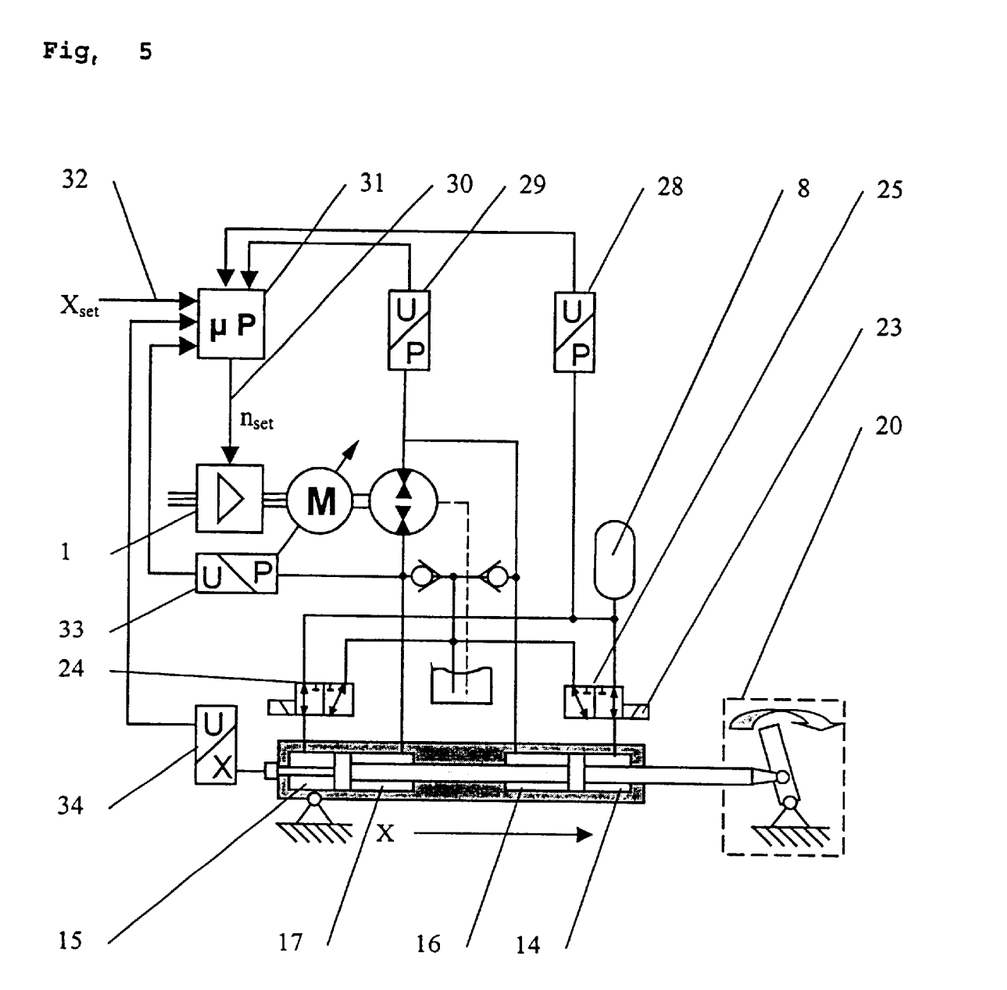
FIG. 5 is a schematic illustration of a drive according to the present invention for operating a rotary joint.

In FIG. 5, the machine joint 20 is designed as a rotary joint. The device according to the invention corresponds in this case largely to the device in FIG. 2. However, the pressure accumulators 8, 9 in FIG. 2 have been replaced by a single pressure accumulator 8 which supplies both valves 24, 25 with pressure oil.

In addition, pressure sensors 28, 29, 33, a position measuring system 34 and a control computer 31 have been depicted in FIG. 5. These elements were not depicted in FIGS. 1 to 4 for the sake of clarity, but make it possible to control the device more accurately. The position measuring system 34 may in this case also be integrated, in particular, in the cylinder or cylinders. In addition to the pressure and position, time derivations of these variables may also be recorded.

The signals from the position measuring system 34 and pressure sensors 28, 29, 33 are available to the control computer 31 which activates the converter 1 according to a control algorithm, such as, for example, a state controller. The desired movement of the device Xset 32 is in this case generated by an machine control master. This makes it possible to control the position and also the force which is exerted on the machine joint 20 by the device according to the invention. The control computer 31 may also be integrated in the converter or in the machine control master. In many applications, it is sufficient to record the pressure in only one cylinder chamber 14, 15, 16, 17.

While the invention has been illustrated and described as embodied in a hydraulic oscillator as a drive of machines, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A device for driving a machine element, comprising:
   a hydraulic actuator operatively connected to a machine element and having a first cylinder and a first piston reciprocating in the first cylinder;
   a hydraulic pump connected in a dosed hydraulic circuit to the actuator;
   a variable-speed electric motor which drives the hydraulic pump; and at least one energy accumulator operatively connected to a member selected from the group consisting of piston and machine element to only apply a potential force on the member in dependence on a position of the member, wherein the energy accumulator is loaded or unloaded in response to a movement of the member.

2. The device of claim 1, and further comprising at least one valve or a coupling for separating the at least one energy accumulator from the hydraulic actuator.

3. The device of claim 1, and further comprising a valve for regulating a fluid flow from the pump to the at least one energy accumulator.

4. The device of claim 1, wherein the hydraulic actuator is an element selected from the group consisting of hydraulic cylinder, hydraulic cylinder with a continuous piston rod, pivoting piston, hydraulic pump and hydraulic motor.

5. The device of claim 1, configured for use to drive a shaft of a crane, press, forming press, bending press, shears, stretch-straightening machine, testing machine, lifting platform of a punching machine, injection-moulding machine, die-casting machine or other machine.

6. The device of clam 1, and further comprising sensors configured to measure pressures, positions or time derivations thereof, and an electronic control receiving a signal in response to the measurement from the sensors.

7. The device of claim 1, wherein the electric motor is a member selected from the group consisting of permanently excited synchronous motor, vector-regulated asynchronous motor, direct-current motor, brushless DC motor, and switched reluctance motor.

8. The device of claim 1, and further comprising an internally or externally toothed, compensated or non-compensated gear pump, a constant or variable displacement axial or radial piston pump, a constant or variable displacement vane-cell pump, a screw pump or another hydrostatic displacement unit.

9. The device of claim 1, wherein the hydraulic actuator has a second cylinder and a second piston reciprocating in the second cylinder and subdividing the second cylinder in two compartments, with the pump further connected to one of the compartments of the second cylinder, said first and second pistons being interconnected, and further comprising a valve for regulating a fluid flow from the pump to the at least one energy accumulator.

10. The device of claim 1, and further comprising a second energy accumulator fluidly connected to the pump, said second energy accumulator, said pump and said at least one energy accumulator being placed in series.

11. The device of claim 1, wherein the piston subdivides the cylinder in two compartments, with the pump connected to one compartment of the first cylinder of the actuator, said energy accumulator fluidly connected to the other one of the compartments of the cylinder.

12. The device of claim 11, wherein the hydraulic actuator has a second cylinder and a second piston reciprocating in the second cylinder and subdividing the second cylinder in two compartments, said pump connected to one of the compartments of the second cylinder of the actuator, and further comprising a second energy accumulator operatively connected to the other one of the compartments of the second cylinder of the hydraulic actuator, wherein the at least one energy accumulator and the second energy accumulator are filled or discharged in response to a movement of the member.

13. The device of claim 11, wherein the hydraulic actuator has a second cylinder and a second piston reciprocating in the second cylinder and subdividing the second cylinder in two compartments, with the pump further connected to one of the compartments of the second cylinder, and further comprising a second energy accumulator fluidly connected to the other one of the compartments of the second cylinder.

14. The device of claim 13, wherein the first and second pistons are interconnected.

15. The device of claim 11, wherein the hydraulic actuator has a second cylinder and a second piston reciprocating in the second cylinder and subdividing the second cylinder in two compartments, with the pump further connected to one of the compartments of the second cylinder, said at least one energy accumulator further connected to the other one of the compartments of the second cylinder.

16. The device of claim 11, wherein the at least one energy accumulator is connected directly with the other one of the compartments of the first cylinder in parallel to the closed hydraulic circuit.

17. The device of claim 1, wherein the energy accumulator is a spring.

* * * * *

UNITED STATES PATENT AND TRADEMARK OFFICE
CERTIFICATE OF CORRECTION

PATENT NO. : 6,647,719 B2
DATED : November 18, 2003
INVENTOR(S) : Rolf Truninger It is certified that error appears in the above-identified patent and that said Letters Patent is hereby corrected as shown below:

<u>Column 6,</u>
Line 64, delete "a dosed hydraulic" insert -- a closed hydraulic --

Signed and Sealed this

Thirtieth Day of March, 2004

JON W. DUDAS
*Acting Director of the United States Patent and Trademark Office*